United States Patent
Szabo

(10) Patent No.: US 11,640,564 B2
(45) Date of Patent: May 2, 2023

(54) METHODS AND APPARATUS FOR MACHINE LEARNING ENGINE OPTIMIZATION

(71) Applicant: The Nielsen Company (US), LLC, New York, NY (US)

(72) Inventor: Rachel Anne Szabo, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 404 days.

(21) Appl. No.: 16/860,930

(22) Filed: Apr. 28, 2020

(65) Prior Publication Data

US 2021/0334585 A1 Oct. 28, 2021

(51) Int. Cl.
G06K 9/62 (2022.01)
G06N 20/20 (2019.01)
G06V 10/75 (2022.01)

(52) U.S. Cl.
CPC .......... *G06K 9/6227* (2013.01); *G06K 9/623* (2013.01); *G06K 9/6262* (2013.01); *G06N 20/20* (2019.01); *G06V 10/751* (2022.01)

(58) Field of Classification Search
CPC .... G06K 9/6227; G06K 9/623; G06K 9/6262; G06N 20/20; G06V 10/751
See application file for complete search history.

(56) References Cited

U.S. PATENT DOCUMENTS

2020/0042825 A1\* 2/2020 Nguyen ............... G06K 9/6271
2021/0224696 A1\* 7/2021 Nasr-Azadani ........ G06N 5/003

OTHER PUBLICATIONS

Khorshid, M., Abou-El-Enien, T. and Soliman, G., 2015. A comparison among support vector machine and other machine learning classification algorithms. IPASJ International Journal of Computer Science (IIJCS).\*
Novaković, J.D., Veljović, A., Ilić, S.S., Papić, Ž. and Milica, T., 2017. Evaluation of classification models in machine learning. Theory and Applications of Mathematics & Computer Science, 7(1), pp. 39-46.\*

\* cited by examiner

*Primary Examiner* — Zhitong Chen
(74) *Attorney, Agent, or Firm* — Hanley, Flight & Zimmerman, LLC

(57) ABSTRACT

Methods, apparatus, systems and articles of manufacture are disclosed for machine learning engine optimization. An example apparatus includes a selection metric analyzer to compute a first selection metric based on a first set of ordered output values from a first candidate machine learning engine and a set of reference data values; compute a second selection metric based on a second set of ordered output values from a second candidate machine learning engine and the set of reference data values; and a machine learning engine replacer to determine whether to replace an active machine learning engine with at least one of the first candidate machine learning engine or the second candidate machine learning engine based on the first selection metric and the second selection metric.

20 Claims, 7 Drawing Sheets

METHODS AND APPARATUS FOR MACHINE LEARNING ENGINE OPTIMIZATION

FIELD OF THE DISCLOSURE

This disclosure relates generally to machine learning, and, more particularly, to methods and apparatus for machine learning engine optimization.

BACKGROUND

Machine learning models enable machines (e.g., computers, logic circuits, etc.) to process input data to generate an output based on patterns and/or associations previously learned by the model via a training process. For example, the machine learning model may be trained with known training data to recognize patterns and/or associations such that the trained model produces output(s) consistent with the recognized patterns and/or associations when unknown input data is later applied to the trained model.

BRIEF DESCRIPTION OF THE DRAWINGS

The figures are not to scale. In general, the same reference numbers will be used throughout the drawing(s) and accompanying written description to refer to the same or like parts.

Figure 1:
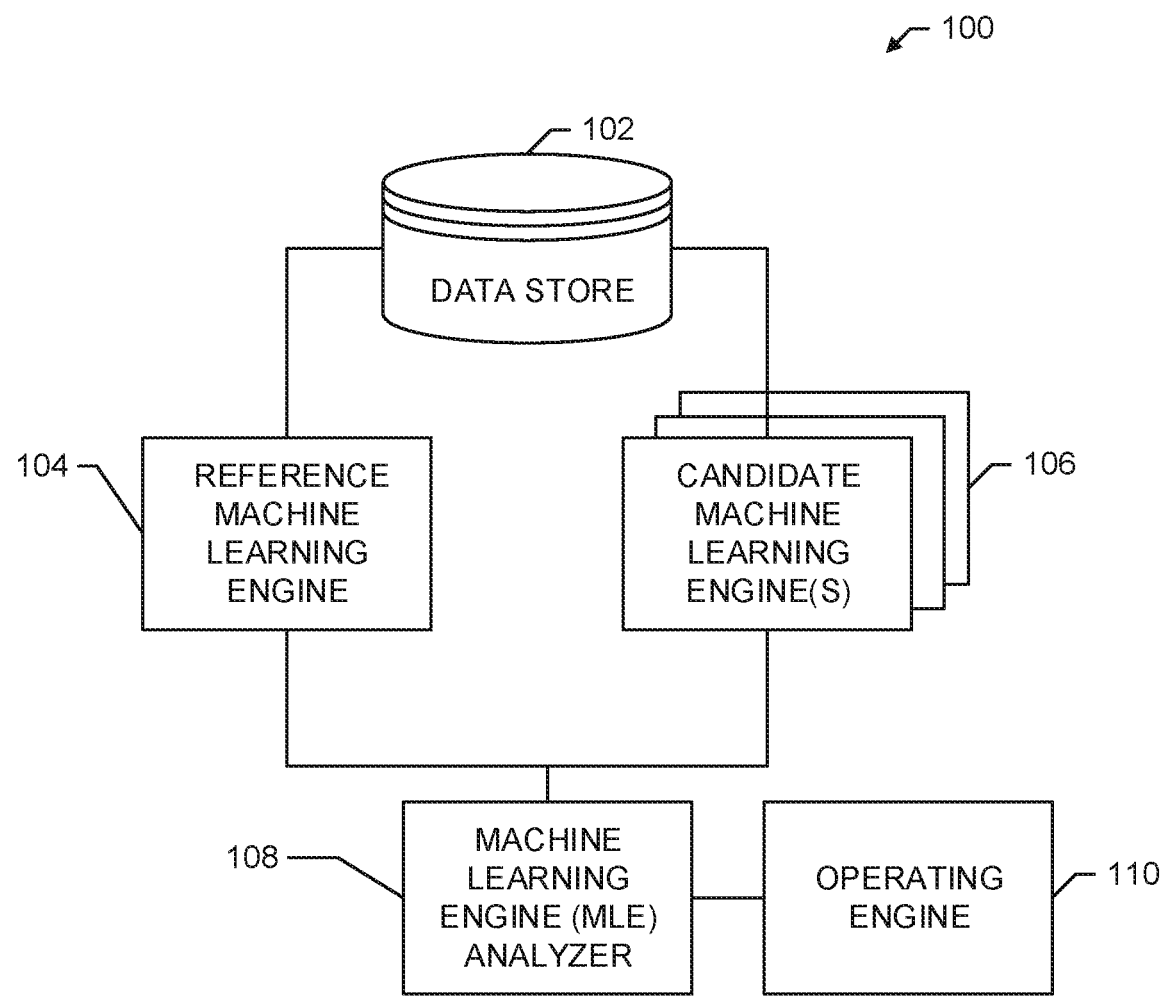
FIG. 1 is a block diagram of an example system to optimize a machine learning engine in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Machine learning workloads, such as training a machine learning model on a large dataset, are challenging and computationally expensive tasks that can take potentially hours to weeks to complete. Furthermore, obtaining the large volumes of data to train a machine learning model used to generate audience measurement metrics that are optimized for audience analysis can take much longer, potentially years to complete. For example, data collection for audience behavior estimation may take years to ensure there is sufficient training data to yield a machine learning model that produces conclusive results.

In some examples, the unavailability of large volumes of labeled data to train the machine learning model causes a real-time correction gap when adjusting the machine learning model over time. In some examples, when adjusting the machine learning model over time, weights and/or outputs from the machine learning model may change due to configurations of the systems. For example, a given machine learning model that has been trained based on vast amounts of data gathered over the years may produce results that are utilized in various downstream systems. That given machine learning model may produce outputs that are reliable and accurate. However, the given machine learning model can be costly to run and/or there may be new machine learning models that are more cost effective and reduce a processing burden on the system implementing the model. In such examples, it may be beneficial to switch to a newer machine learning model to decrease cost and improve operation of the computing system. However, the newer machine learning models may output data values that are different than outputs of the given machine learning model currently being used. This is not ideal because the newer machine learning model may hinder the operations of the downstream systems (e.g., the data will not be accurate), thereby requiring costly and expensive training processes to be conducted on the newer machine learning model.

Examples disclosed herein are directed to methods and apparatus for machine learning engine optimization. In some disclosed examples, a machine learning engine analyzer analyzes outputs of candidate machine learning engines to optimize the overall system by replacing an active machine learning engine with a candidate machine learning engine that will reduce processing requirements of a system, improve operations of downstream systems, and will be more cost effective. In particular, the machine learning engine analyzer of examples disclosed herein computes selection metrics for candidate machine learning engines that are utilized to select the candidate machine learning engine that will optimize the overall system.

FIG. 1 is a block diagram of an example system 100 for optimizing machine learning engine(s). The system 100 of the illustrated example includes an example data store 102, an example reference machine learning engine 104, example candidate machine learning engine(s) 106, an example machine learning engine (MLE) analyzer 108, and an example operating engine 110.

The data store 102 of the illustrated example is implemented by any memory, storage device and/or storage disc for storing data such as, for example, flash memory, magnetic media, optical media, solid state memory, hard drive(s), thumb drive(s), etc. Furthermore, the data stored in the example data store 102 may be in any data format such as, for example, binary data, comma delimited data, tab delimited data, structured query language (SQL) structures, etc. While, in the illustrated example, the data store 102 is illustrated as a single device, the example data store 102 and/or any other data storage devices described herein may be implemented by any number and/or type(s) of memories. In the illustrated example, the data store 102 stores audience measurement information that is to be analyzed by the reference machine learning engine 104, and the candidate machine learning engine(s) 106. However, any type of information may be stored in the example data store 102 for execution by the reference machine learning engine 104, and the candidate machine learning engine(s) 106. For example, the data store 102 may store information related to vehicle engine diagnostics, restaurant information, etc.

The reference machine learning engine 104 is an active machine learning engine that is utilized by the operating engine 110. In the illustrated example, the reference machine learning engine 104 processes the audience measurement information from the data store 102 and transmits the outputs to the operating engine 110 for further processing. In some examples, the output from the reference machine learning engine 104 is a set of reference data values that are unranked. As used herein, "unranked" refers to data values that are output from a machine learning engine and do not have a rank associated with an importance of the data value. For example, the set of reference data values may include a list corresponding to the following: 1. Element A; 2. Element B; 3. Element C. While the elements are listed in a particular order, they remain unranked (e.g., Element A may not be the most important value, but is considered important because it is near beginning positions of the reference data values). The reference machine learning engine 104 of the illustrated example may implement any machine learning architecture(s) such as, for example, a neural network, a deep neural network (DNN), a recurrent neural network (RNN), a convolutional neural network (CNN), etc.

The candidate machine learning engine(s) 106 are machine learning engines that are to be analyzed to determine if they will improve (e.g., optimize) the operating engine 110. In some examples, the candidate machine learning engine(s) 106 have been identified as providing a potential improvement to the operating engine relative to the reference machine learning engine 104. For example, the candidate machine learning engine(s) 106 may be more cost effective, reduce processing time, etc., compared to the reference machine learning engine 104. However, the output of the candidate machine learning engine(s) 106 requires further analysis to determine if the candidate machine learning engine(s) 106 include a suitable candidate to optimize the operating engine 110.

For example, a given candidate machine learning engine 106 can be structured to process the audience measurement information from the data store 102 and transmit the outputs to the MLE analyzer 108 for further processing. Furthermore, the candidate machine learning engine(s) 106 can be structured to produce ordered output values that are ranked. As used herein, "ranked" refers to data values that are output from a candidate machine learning engine and have a rank associated with an importance of the data value based on a configuration of the candidate machine learning engine. For example, the ordered output values may include a list corresponding to the following: 1. Element X; 2. Element Y; 3. Element Z. The particular order of the ordered output values identifies the rank associated with each value (i.e., Element X is the most important value for the particular candidate machine learning engine in this example). The candidate machine learning engine(s) 106 of the illustrated example may implement any machine learning architecture(s) such as, for example, a neural network, a deep neural network (DNN), a recurrent neural network (RNN), a convolutional neural network (CNN), etc.

The MLE analyzer 108 of the illustrated example analyzes the ordered output values from the candidate machine learning engine(s) 106 and the reference data values output by the reference machine learning engine 104 to determine if any of the candidate machine learning engine(s) 106 will improve (e.g., optimize) operation of the operating engine 110 while also providing output data consistent with that of the reference machine learning engine 104. For example, the MLE analyzer 108 computes selection metrics based on the sets of ordered output values from the candidate machine learning engine(s) 106 and the set of reference data values from the reference machine learning engine 104. Computation of the selection metrics is discussed in more detail below in connection with FIG. 2. The MLE analyzer 108 compares the selection metrics to determine which, if any, of the candidate machine learning engine(s) 106 will improve (e.g., optimize) operation of the operating engine 110. For example, the MLE analyzer 108 compares the selection metrics from the candidate machine learning engine(s) 106 and selects the candidate machine learning engine(s) 106 with the lowest selection metric as the selected candidate machine learning engine 106 to replace the reference machine learning engine 104 to improve (e.g., optimize) operation of the operating engine 110. In some examples, the MLE analyzer 108 may compare the selection metrics to a threshold. For example, the MLE analyzer 108 may compare the lowest selection metric to the threshold to determine if the selection metric is sufficiently low to indicate that the selected candidate machine learning engine 106 will yield output data consistent with the replaced reference machine learning engine 104. In some examples, if the lowest selection metric does not satisfy the threshold, the MLE analyzer 108 does not replace the reference machine learning engine 104 with any of the candidate machine learning engine(s) 106. If the MLE analyzer 108 replaces the reference machine learning engine 104 with the selected candidate machine learning engine 106, the selected candidate machine learning engine 106 becomes the reference machine learning engine 104 going forward.

The operating engine 110 of the illustrated example utilizes the output data from the reference machine learning engine 104 to perform downstream processing. For example, the operating engine 110 may utilize the output from the reference machine learning engine 104 to generate reports related to audience measurement analytics. In some examples, the operating engine 110 may utilize the output from the reference machine learning engine 104 in other downstream processing, such as computing audience measurement statistics for particular analysis. As such, it is beneficial to maintain the accuracy of the output from the reference machine learning engine 104 when it is replaced with a selected candidate machine learning engine 106 (e.g., by confirming that the ordered output values from the selected candidate machine learning engine 106 maintain a level of accuracy associated with the output of the reference machine learning engine 104). In some examples, identifying the candidate machine learning engine(s) 106 to replace the reference machine learning engine 104 may result in reduced costs associated with processing audience measurement information, may reduce the amount of information the operating engine 110 needs to process, etc.

Figure 2:
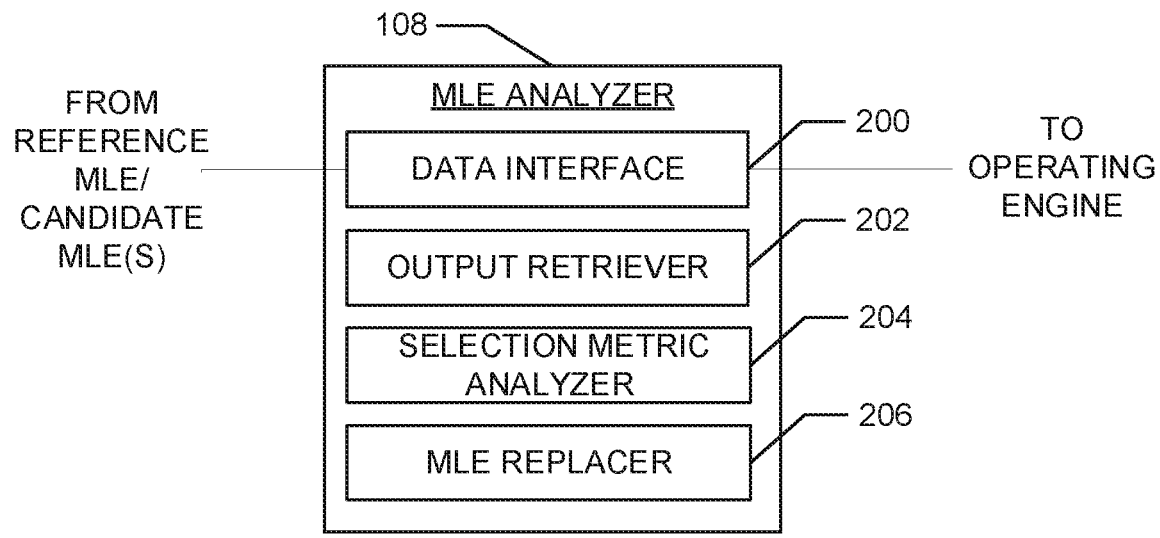
FIG. 2 is a block diagram of an example machine learning engine analyzer included in the example system of FIG. 1.

FIG. 2 is a block diagram of the example MLE analyzer 108 of FIG. 1. The MLE analyzer 108 of the illustrated example of FIG. 2 includes an example data interface 200, an example output retriever 202, an example selection metric analyzer 204, and an example machine learning engine (MLE) replacer 206.

The example data interface 200 receives a set of reference data values from the reference machine learning engine 104, and ordered output values from the candidate machine learning engine(s) 106. In some examples, the data interface 200 communicates with the reference machine learning engine 104, the candidate machine learning engine(s) 106, and the operating engine 110. In some examples, the data interface 200 communicates the outputs from the reference machine learning engine 104 and/or the outputs from the candidate machine learning engine(s) 106 to the operating engine 110. For example, when the reference machine learning engine 104 is operating, the data interface 200 transmits the outputs to the operating engine 110. In some examples, when the candidate machine learning engine(s) 106 is to replace the reference machine learning engine 104, the data interface transmits the output from the candidate machine learning engine(s) 106 to the operating engine 110. The example data interface 200 transmits the outputs to the output retriever 202.

The example output retriever 202 retrieves the outputs from the reference machine learning engine 104 and the candidate machine learning engine(s) 106. For example, the output retriever 202 retrieves the set of reference data values from the reference machine learning engine 104, and the ordered output values from the candidate machine learning engine(s) 106. In some examples, the output retriever 202 separates the outputs from the reference machine learning engine 104 and the candidate machine learning engine(s) 106. For example, the output retriever 202 may separate the set of reference data values from the reference machine learning engine 104 into unordered reference data values. In some example, the output retriever 202 identifies the unordered reference data values as not requiring a selection metric. That is, the output retriever 202 identifies the unordered reference data values as the values to be utilized to the determine the selection metrics for the candidate machine learning engine(s) 106 (e.g., the values to replace). In the illustrated example, the output retriever 202 identifies the outputs from each candidate machine learning engine(s) 106 for which the selection metric analyzer 204 is to compute a selection metric.

The selection metric analyzer 204 of the illustrated example determines selection metrics for the candidate machine learning engine(s) 106. The selection metric analyzer 204 utilizes the selection metrics to determine whether to replace the reference machine learning engine 104 by computing selection metrics for candidate machine learning engine(s) 106. For example, the selection metric analyzer 204 determines whether a first machine learning engine (e.g., a first one of the candidate machine learning engine(s) 106) is better suited to improve (e.g., optimize) operation of the operating engine 110 than a second machine learning engine (e.g., a second one of the candidate machine learning engine(s) 106).

To determine whether to replace the reference machine learning engine 104, the selection metric analyzer 204 computes a first selection metric for a first candidate machine learning engine 106 based on a first set of ordered output values from the first candidate machine learning engine 106 and a set of reference data values that correspond to the reference machine learning engine 104. In some examples, the first set of ordered output values are ranked by order of importance based on a configuration of the first candidate machine learning engine 106. The selection metric analyzer 204 computes a second selection metric based on a second set of ordered output values from a second candidate machine learning engine 106 and the set of reference data values. In some examples, the second set of ordered output values are ranked by order of importance based on a configuration of the second candidate machine learning engine 106. In some examples, the set of reference data values includes unordered reference data values that are utilized to determine consecutive highest rankings in the first set of ordered output values from the first candidate machine learning engine 106 and the second set of ordered output values from second candidate machine learning engine 106 to determine a candidate machine learning engine 106 to replace the reference machine learning engine 104.

In the illustrated example, to compute the first selection metric, the selection metric analyzer 204 determines a first evaluation metric. For example, the selection metric analyzer 204 computes the first evaluation metric by determining a first difference between 1) a number of the unordered reference data values in the set of reference data values and 2) a number of the unordered reference data values included in beginning positions of the first set of ordered output values output from the first candidate machine learning engine 106. As used herein, "beginning positions" refers to a number of values ranked in the beginning of an ordered set (e.g., at the top of an ordered list of the set of ordered values). For example, considering a set of values that includes 30 ordered values. The "beginning positions" may refer to values indexed 1-10 in the ordered set of values, with index 1 representing the highest ranked value. However, any number of values may be considered beginning positions (e.g., values 1-3 are beginning positions for a list of 40 values, values 1-37 are beginning positions for a list of 400 values, etc.). In some examples, the number of beginning positions to be evaluated by the selection metric analyzer 204 is specified as a configuration input parameter. In the illustrated example, the selection metric analyzer 204 further computes the first evaluation metric by dividing the first difference by the number of the unordered reference data values from the set of reference data values.

In the illustrated example, to compute the first selection metric, the selection metric analyzer 204 also determines a second evaluation metric. For example, the selection metric analyzer 204 computes the second evaluation metric by determining a second difference between 1) a number corresponding to how many of the unordered reference data values from the set of reference data values are present in the first set of ordered output values from the first candidate machine learning engine 106 and 2) the number of the unordered reference data values from the set of reference data values. In the illustrated example the selection metric analyzer 204 further adds a penalty to the second difference for each of the unordered reference data values from the set of reference data values that is not present in the first set of ordered output values. In some examples, the penalty is one fourth for each missing value. However, the penalty may be any value (e.g., one half, three, etc.). In some examples, the penalty is specified as a configuration input parameter. In the illustrated example, the selection metric analyzer 204 further computes the second evaluation metric by dividing the second difference by an addition of 1) the number of values in the first set of ordered output values and 2) the number of the unordered reference data values from the set of reference data values.

In the illustrated example. to determine the first selection metric, the selection metric analyzer 204 further adds together the first evaluation metric and the second evaluation metric. In some examples, the selection metric analyzer 204 divides the result by two. The outcome of this process is the first selection metric. The selection metric analyzer 204 computes selection metrics for any remaining candidate machine learning engines 106 in a similar manner as described above for the first selection metric.

The selection metric analyzer 204 then compares the selection metrics determined for the respective candidate machine learning engines 106 to identify the lowest selection metric. For example, the selection metric analyzer 204 identifies the respective candidate machine learning engine 106 having a corresponding selection metric that is closest to zero. However, any other value may be selected. In some examples, the selection metric analyzer 204 compares the first selection metric determined for the first candidate machine learning engine 106 to the second selection metric determined for the second candidate machine learning engine 106.

In some examples, the selection metric analyzer 204 may determine selection metrics for three candidate machine learning engines 106. In this example, the reference machine learning engine 104 outputs example unordered reference data values corresponding to cat, dog horse. The selection metric analyzer 204 may analyze beginning positions of sets of ordered output values from the three candidate machine learning engines 106. In this example, a first candidate machine learning engine 106 outputs beginning positions of ordered output values corresponding to cat, horse dog; a second candidate machine learning engine 106 outputs beginning positions of ordered output values corresponding to dog, snake, rabbit; and a third candidate machine learning engine 106 outputs beginning positions of ordered output values corresponding to snake, horse, cow. The selection metric analyzer 204 of the illustrated example, computes selection metrics as described above for the three candidate machine learning engines 106. In this example, selection metric analyzer 204 computes a selection metric of 0 for the first candidate machine learning engine 106, a selection metric of 0.44 for the second candidate machine learning engine 106, and a selection metric of 0.33 for the third candidate machine learning engine 106.

The selection metric analyzer 204 determines whether to replace the reference machine learning engine 104 with the first candidate machine learning engine 106 or the second candidate machine learning engine 106 based on the first selection metric and the second selection metric. In some examples, the selection metric analyzer 204 compares the selection metric of the candidate machine learning engine 106 that was identified as the lowest selection metric (e.g., the selected one of the first and second candidate machine learning engines 106) to a threshold. For example, the threshold may be 0.5. However, any other value for the threshold may be used. In such an example, the selection metric analyzer 204 compares the selection metric of the selected candidate machine learning engine 106 to the threshold and determines whether to replace the reference machine learning engine 104 with the selected candidate machine learning 106. If the selection metric is below the threshold, the selection metric analyzer 204 replaces the reference machine learning engine 104 with the selected candidate machine learning engine 106. However, if the selection metric is greater than the threshold, the selection metric analyzer 204 determines not to replace the reference machine learning engine 104 with the selected candidate machine learning engine 106.

In the illustrated example, the MLE replacer 206 is responsible for replacing the reference machine learning engine 104 with the selected candidate machine learning engine 106. In some examples, the MLE replacer 206 re-directs outputs from the selected candidate machine learning engine 106 to the operating engine 110 to replace the reference machine learning engine 104. In some example, the MLE replacer 206 transmits the software of the selected candidate machine learning engine 106 to the operating engine 110, which executes the candidate machine learning engine 106 locally. In some example, the MLE replacer 206 transmits a message to the data interface 200 to re-direct the output of the selected candidate machine learning engine 106 to the operating engine 110.

While an example manner of implementing the MLE analyzer 108 of FIG. 1 is illustrated in FIG. 2, one or more of the elements, processes and/or devices illustrated in FIG. 2 may be combined, divided, re-arranged, omitted, eliminated and/or implemented in any other way. Further, the example data interface 200, the example output retriever 202, the example selection metric analyzer 204, the example MLE replacer 206, and/or, more generally, the example MLE analyzer 108 of FIG. 2 may be implemented by hardware, software, firmware and/or any combination of hardware, software and/or firmware. Thus, for example, any of the example data interface 200, the example output retriever 202, the example selection metric analyzer 204, the example MLE replacer 206, and/or, more generally, the example MLE analyzer 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 200, the example output retriever 202, the example selection metric analyzer 204, the example MLE replacer 206, and/or, more generally, the example MLE analyzer 108 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example MLE analyzer 108 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
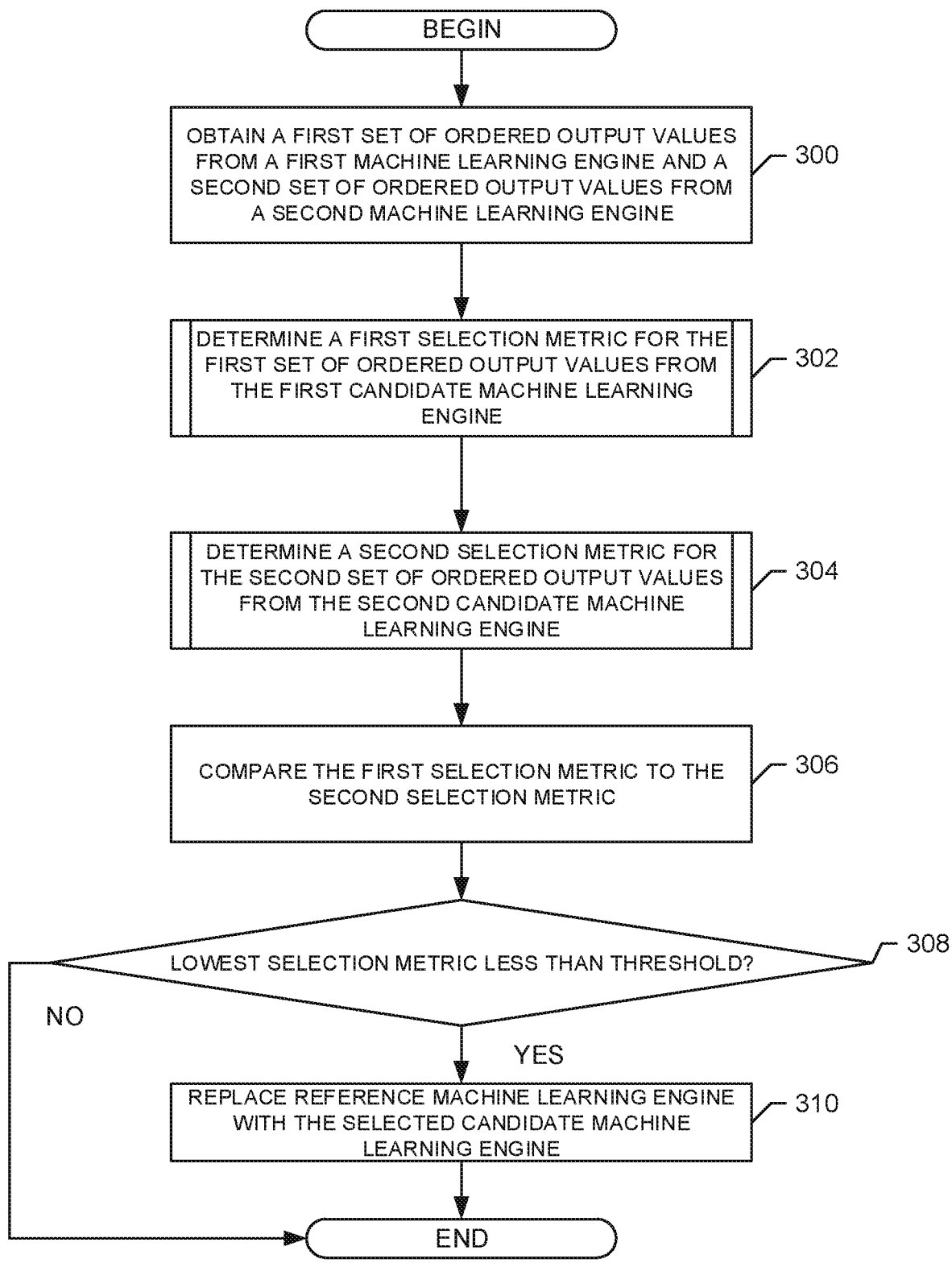
FIGS. 3-5 are flowcharts representative of machine readable instructions which may be executed to implement the machine learning engine analyzer of FIGS. 1 and 2.
Figure 4:
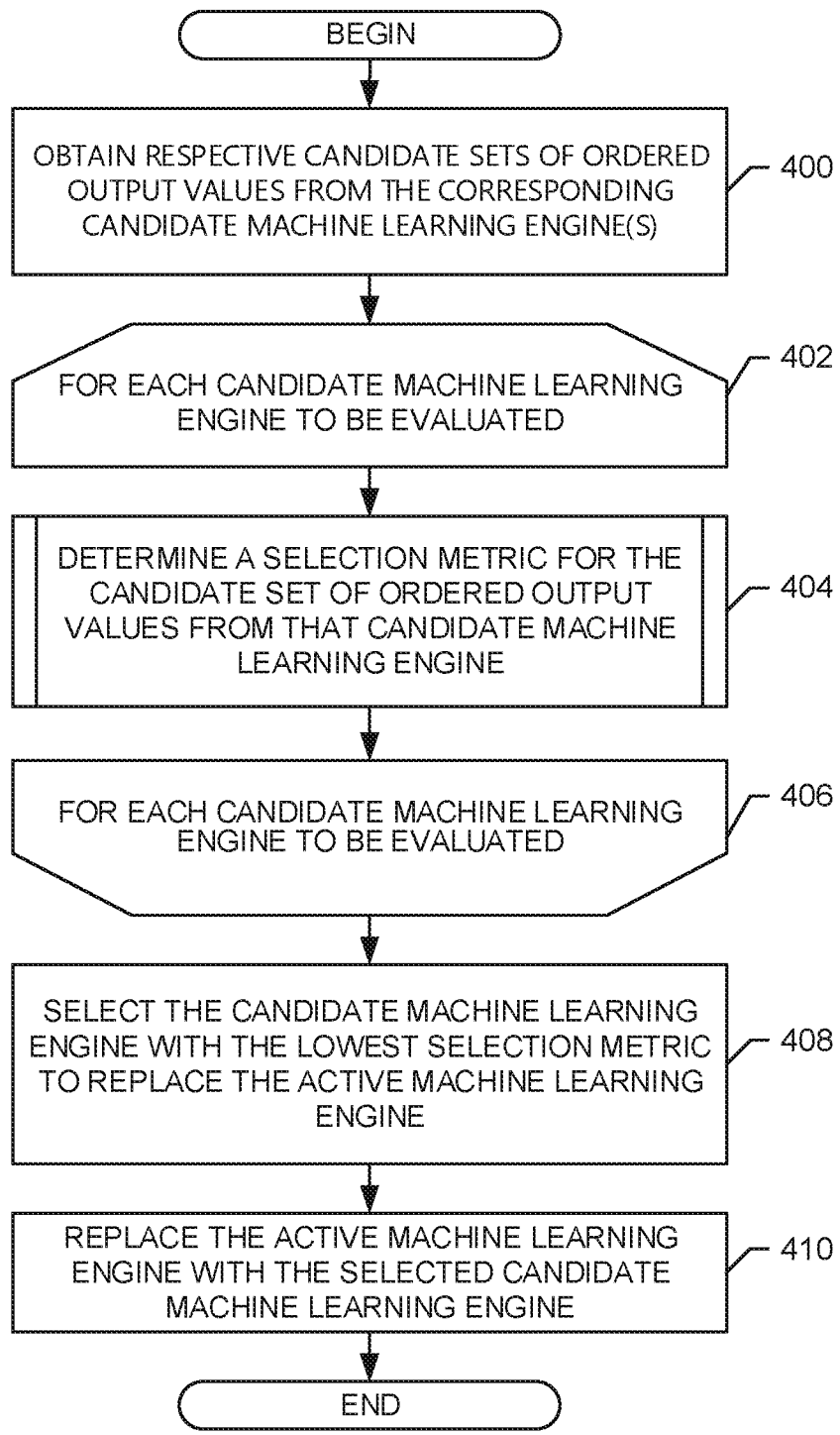
Figure 5:
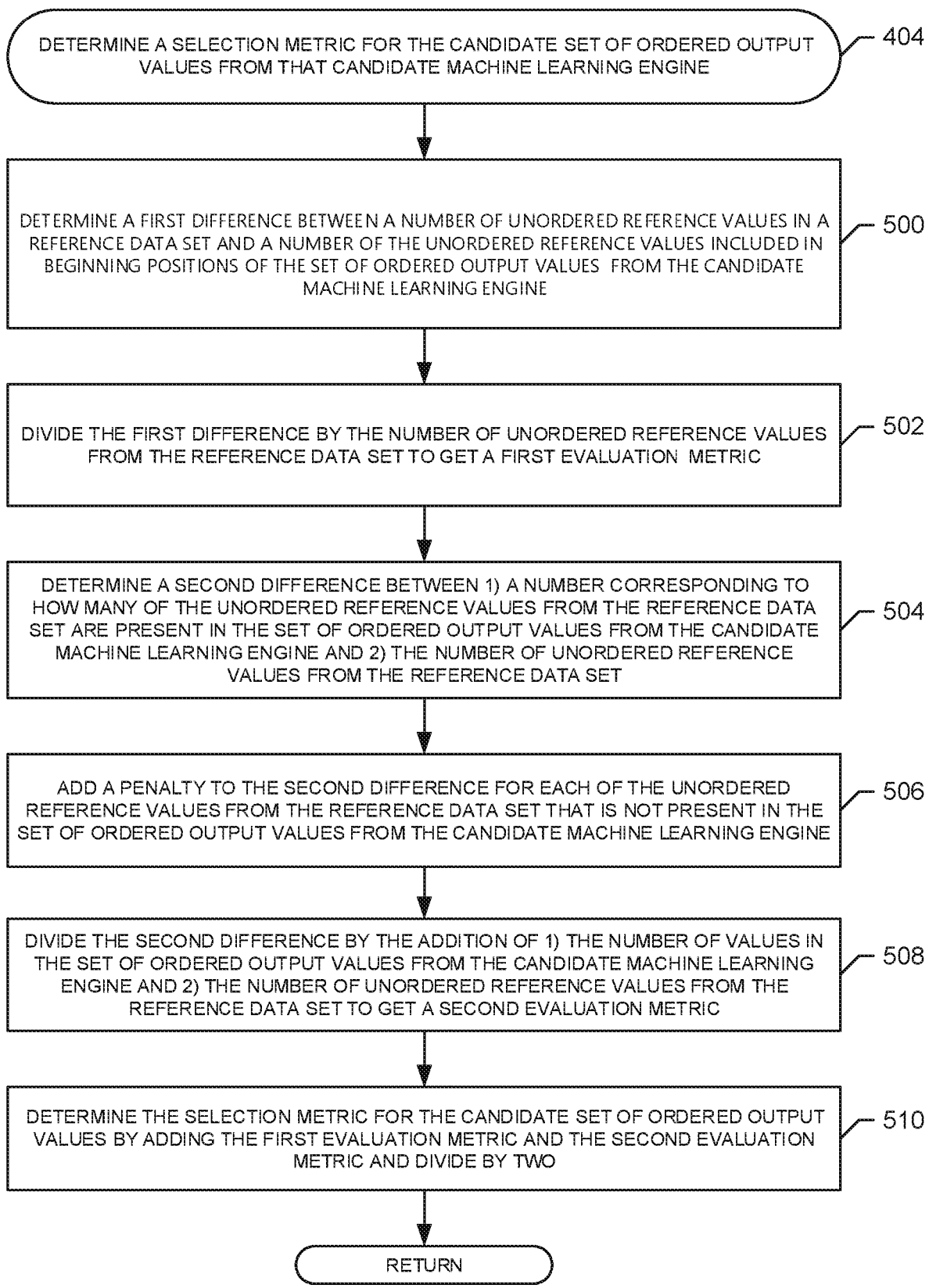

Flowcharts representative of example hardware logic, machine readable instructions, hardware implemented state machines, and/or any combination thereof for implementing the MLE analyzer 108 of FIGS. 1 and 2 are shown in FIGS. 3-5. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-5, many other methods of implementing the example MLE analyzer 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is an example flowchart representative of machine readable instructions that may be executed to implement the MLE analyzer 108 of FIGS. 1 and/or 2. The program of FIG. 3 begins at block 300 when MLE analyzer 108 obtains a first set of ordered output values from a first machine learning engine and a second set of ordered output values from a second machine learning engine. For example, the data interface 200 obtains the first set of ordered output values from the first candidate machine learning engine 106, and the second set of ordered output values from the second candidate machine learning engine 106. In some examples, the program of FIG. 3 can begin when the MLE analyzer 108 obtains a number of unordered reference values from a reference data set. For example, the MLE analyzer 108 can obtain the number of unordered reference values from the reference machine learning engine 104, the data store 102, and/or from an audience measurement entity.

At block 302, the MLE analyzer 108 determines a first selection metric for the first set of ordered output values from the first candidate machine learning engine 106. For example, the selection metric analyzer 204 determines the first selection metric for the first candidate machine learning engine 106 in accordance with the description of FIG. 2.

At block 304, the MLE analyzer 108 determines a second selection metric for the second set of ordered output values from the second candidate machine learning engine 106. For example, the selection metric analyzer 204 determines the second selection metric for the second candidate machine learning engine 106 in accordance with the description of FIG. 2.

At block 306, the MLE analyzer 108 compares the first selection metric to the second selection metric. For example, the selection metric analyzer 204 compares the first selection metric to the second selection metric to identify the selection metric that is closest to zero. The selection metric analyzer 204 identifies the one of the first or second candidate machine learning engine 106 with the selection metric that is closest to zero as the selected candidate machine learning engine 106.

At block 308, the MLE analyzer 108 determines if the lowest selection metric (corresponding to the candidate machine learning engine 106) is less than (or less than or equal to) a threshold. For example, the selection metric analyzer 204 compares the lowest selection metric from block 306 to the threshold. In some examples, the threshold is 0.5, or some other value. In some examples, the selection metric analyzer 204 determines to replace the reference machine learning engine 104 with the selected candidate machine learning engine 106 without comparing the lowest selection metric to the threshold.

If the MLE analyzer 108 determines that the lowest selection metric is greater than the threshold, the program ends. If the MLE analyzer 108 determines that the lowest selection metric is less than the threshold, the program proceeds to block 310 and the MLE analyzer 108 replaces the reference machine learning engine 104 with the selected candidate machine learning engine 106. For example, the MLE replacer 206 replaces the reference machine learning engine 104 with the selected candidate machine learning engine 106. The program ends.

FIG. 4 is an example flowchart representative of machine readable instructions that may be executed to implement the MLE analyzer 108 of FIGS. 1 and/or 2. The program of FIG. 4 begins at block 400 when MLE analyzer 108 obtains respective candidate sets of ordered output values from the corresponding candidate machine learning engine(s) 106. For example, the output retriever 202 obtains the candidate sets of ordered output values from candidate machine learning engine(s) 106.

For each candidate machine learning engine 106 to be evaluated (block 402), the MLE analyzer 108 determines a selection metric for the candidate set of ordered output values from that candidate machine learning engine 106 (block 404). For example, the selection metric analyzer 204 determines a respective selection metric for each of the candidate sets of ordered output values for each of the candidate machine learning engines 106. An example program that may be used to implement block 404 is described below in connection with FIG. 5.

When all candidate machine learning engine(s) have been processed (block 406), the MLE analyzer 108 selects the candidate machine learning engine 106 with the lowest selection metric to replace the active machine learning engine (block 408). For example, the selection metric analyzer 204 selects the candidate machine learning engine 106 with the lowest selection metric to replace the reference machine learning engine 104. In some examples, the selection metric analyzer 204 may compare the lowest selection metric to a threshold to determine if the reference machine learning engine 104 should remain in operation.

At block 410, the MLE analyzer 108 replaces the active machine learning engine with the selected candidate machine learning engine 106. For example, the MLE replacer 206 replaces the reference machine learning engine 104 with the selected candidate machine learning engine 106. The program ends.

FIG. 5 is a flowchart representative of example machine readable instructions that may be executed to implement the processes of block 404 to determine a selection metric for the candidate set of ordered output values from the candidate machine learning engine. The program begins at block 500 when the MLE analyzer 108 determines a first difference between a number of unordered reference values in a reference data set and a number of the unordered reference values included in beginning positions of the set of ordered output values from the candidate machine learning engine.

At block 502, the MLE analyzer 108 divides the first difference by the number of unordered reference values from the reference data set to get a first evaluation metric.

At block, 504, the MLE analyzer 108 determines a second difference between 1) a number corresponding to how many of the unordered reference values from the reference data set are present in the set of ordered output values from the candidate machine learning engine and 2) the number of unordered reference values from the reference data set.

At block 506, the MLE analyzer 108 adds a penalty to the second difference for each of the unordered reference values from the reference data set that is not present in the set of ordered output values from the candidate machine learning engine.

At block 508, the MLE analyzer 108 divides the second difference by the addition of 1) the number of values in the set of ordered output values from the candidate machine learning engine and 2) the number of unordered reference values from the reference data set to get a second evaluation metric.

At block 510, the MLE analyzer 108 determines the selection metric for the candidate set of ordered output values by adding the first evaluation metric and the second evaluation metric and dividing by two. The process of FIG. 5 then returns to block 406.

Figure 6:
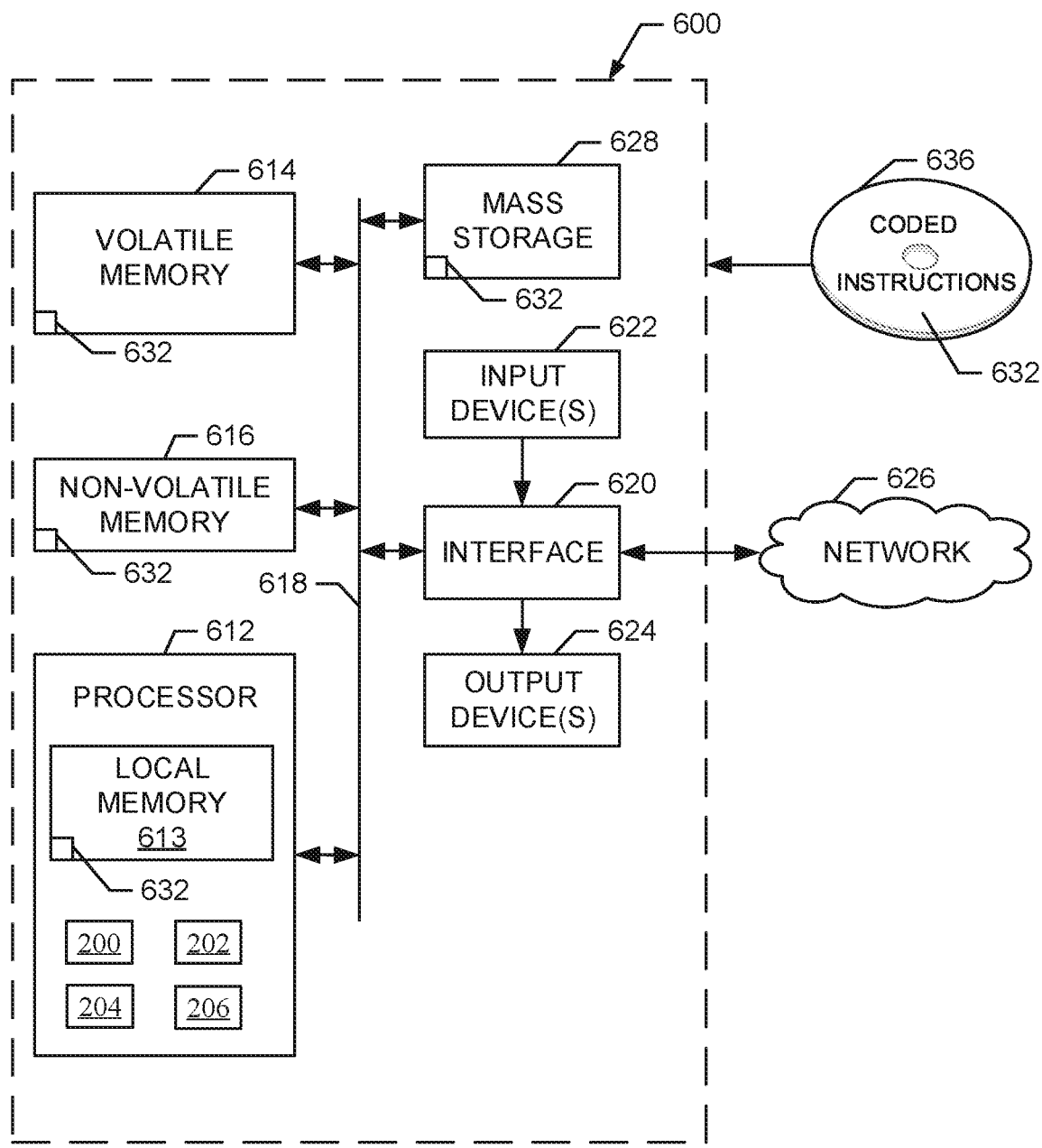
FIG. 6 is a block diagram of an example processing platform structured to execute the instructions of FIGS. 3, 4 and/or 5 to implement the example machine learning engine analyzer of FIGS. 1 and/or 2.

FIG. 6 is a block diagram of an example processor platform 600 structured to execute the instructions of FIGS. 3, 4 and/or 5 to implement the MLE analyzer 108 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 200, the example output retriever 202, the example selection metric analyzer 204, the example MLE replacer 206, and/or, more generally, the example MLE analyzer 108 of FIG. 2.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

Figure 7:
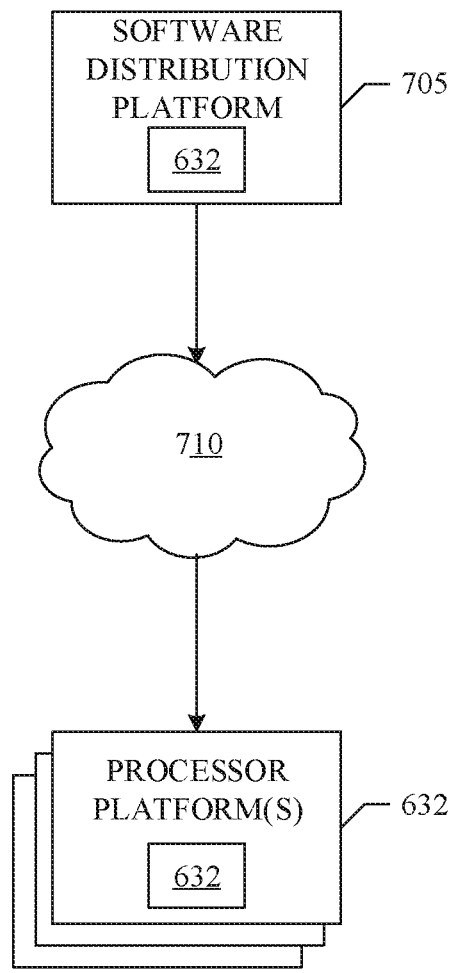
FIG. 7 is a block diagram of an example software distribution platform to distribute software (e.g., software corresponding to the example computer readable instructions of FIGS. 3, 4 and/or 5) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 705 to distribute software such as the example computer readable instructions 632 of FIG. 6 to third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 632 of FIG. 6. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the computer readable instructions 632, which may correspond to the example computer readable instructions of FIGS. 3, 4 and/or 5, as described above. The one or more servers of the example software distribution platform 705 are in communication with a network 710, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 632 from the software distribution platform 705. For example, the software, which may correspond to the example computer readable instructions of FIGS. 3, 4 and/or 5, may be downloaded to the example processor platform 600, which is to execute the computer readable instructions 632 to implement the MLE analyzer 108. In some example, one or more servers of the software distribution platform 705 periodically offer, transmit, and/or force updates to the software (e.g., the example computer readable instructions 632 of FIG. 6) to ensure improvements, patches, updates, etc. are distributed and applied to the software at the end user devices.

From the foregoing, it will be appreciated that example methods, apparatus and articles of manufacture have been disclosed for machine learning engine optimization. The examples disclosed herein are directed to methods and apparatus to analyze outputs of candidate machine learning engines to optimize an operating system by replacing an active machine learning engine with a candidate machine learning engine that will reduce processing requirements of a system, improve operations of subsequent systems, and will be more cost effective. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a selection metric analyzer to:
compute a first selection metric based on a first set of ordered output values from a first candidate machine learning engine and a set of reference data values, the first selection metric computed based on (i) a difference between a first number of the reference data values in the set of reference data values and a second number of the reference data values included in beginning positions of the first set of ordered output values from the first candidate machine learning engine, and (ii) division of the difference by the first number of the reference data values in the set of reference data values; and
compute a second selection metric based on a second set of ordered output values from a second candidate machine learning engine and the set of reference data values; and
a machine learning engine replacer to determine whether to replace an active machine learning engine with at least one of the first candidate machine learning engine or the second candidate machine learning engine based on the first selection metric and the second selection metric.

2. The apparatus of claim 1, wherein the first set of ordered output values are ranked by order of importance based on a configuration of the first candidate machine learning engine, and the second set of ordered output values are ranked by order of importance based on a configuration of the second candidate machine learning engine.

3. The apparatus of claim 2, wherein the reference data values in the set of reference data values are unordered reference data values that are utilized to determine consecutive highest rankings in the first set of ordered output values from the first candidate machine learning engine and the second set of ordered output values from second candidate machine learning engine.

4. The apparatus of claim 3, wherein the division of the difference by the first number of the reference data values corresponds to a first evaluation metric.

5. The apparatus of claim 4, wherein the difference is a first difference, and the selection metric analyzer is to determine a second evaluation metric based on:
a second difference between 1) a number corresponding to how many of the reference data values from the set of reference data values are present in the first set of ordered output values and 2) the first number of the reference data values from the set of reference data values;
addition of a penalty to the second difference for each of the reference data values from the set of reference data values that is not present in the first set of ordered output values; and
division of the second difference by an addition of 1) a number of values in the first set of ordered output values and 2) the first number of the reference data values from the set of reference data values.

6. The apparatus of claim 5, wherein the penalty has a value of one-fourth.

7. The apparatus of claim 5, wherein to determine the first selection metric further, the selection metric analyzer is to:
add the first evaluation metric and the second evaluation metric to determine a result; and
divide the result by two to determine the first selection metric.

8. The apparatus of claim 1, wherein to determine whether to replace the active machine learning engine with the at least one of the first candidate machine learning engine or the second candidate machine learning engine, the selection metric analyzer is to:
compare the first selection metric to the second selection metric to identify a lowest selection metric;
compare the lowest selection metric to a threshold to determine if the at least one of the first candidate machine learning engine or the second candidate machine learning engine should replace the active machine learning engine; and
the machine learning engine replacer is to replace the active machine learning engine with the at least one of the first candidate machine learning engine or the second candidate machine learning engine when the lowest selection metric satisfies the threshold.

9. A non-transitory computer readable storage medium comprising instructions which, when executed, cause one or more processors to at least:
compute a first selection metric based on a first set of ordered output values from a first candidate machine learning engine and a set of reference data values, the first selection metric computed based on (i) a difference between a first number of the reference data values in the set of reference data values and a second number of the reference data values included in beginning positions of the first set of ordered output values from the first candidate machine learning engine, and (ii) division of the difference by the first number of the reference data values in the set of reference data values;
compute a second selection metric based on a second set of ordered output values from a second candidate machine learning engine and the set of reference data values; and
determine whether to replace an active machine learning engine with at least one of the first candidate machine learning engine or the second candidate machine learning engine based on the first selection metric and the second selection metric.

10. The computer readable storage medium of claim 9, wherein the first set of ordered output values are ranked by order of importance based on a configuration of the first candidate machine learning engine, and the second set of ordered output values are ranked by order of importance based on a configuration of the second candidate machine learning engine.

11. The computer readable storage medium of claim 10, wherein the reference data values in the set of reference data values are unordered reference data values that are utilized to determine consecutive highest rankings in the first set of ordered output values from the first candidate machine learning engine and the second set of ordered output values from second candidate machine learning engine.

12. The computer readable storage medium of claim 11, wherein the division of the difference by the first number of the reference data values corresponds to a first evaluation metric.

13. The computer readable storage medium of claim 12, wherein the difference is a first difference and the instructions, when executed, cause the one or more processors to determine a second evaluation metric based on:
   a second difference between 1) a number corresponding to how many of the unordered reference data values from the set of reference data values are present in the first set of ordered output values and 2) the first number of the reference data values from the set of reference data values;
   addition of a penalty to the second difference for each of the reference data values from the set of reference data values that is not present in the first set of ordered output values; and
   division of the second difference by an addition of 1) a number of values in the first set of ordered output values and 2) the first number of the reference data values from the set of reference data values.

14. The computer readable storage medium of claim 13, wherein the instructions, when executed, cause the one or more processors to:
   add the first evaluation metric and the second evaluation metric to determine a result; and
   divide the result by two to determine the first selection metric.

15. A method comprising:
   computing, by executing an instruction with a processor, a first selection metric based on a first set of ordered output values from a first candidate machine learning engine and a set of reference data values, the first selection metric computed based on (i) a difference between a first number of the reference data values in the set of reference data values and a second number of the reference data values included in beginning positions of the first set of ordered output values from the first candidate machine learning engine, and (ii) division of the difference by the first number of the reference data values in the set of reference data values;
   computing, by executing an instruction with the processor, a second selection metric based on a second set of ordered output values from a second candidate machine learning engine and the set of reference data values; and
   determining, by executing an instruction with the processor, whether to replace an active machine learning engine with at least one of the first candidate machine learning engine or the second candidate machine learning engine based on the first selection metric and the second selection metric.

16. The method of claim 15, wherein the first set of ordered output values are ranked by order of importance based on a configuration of the first candidate machine learning engine, and the second set of ordered output values are ranked by order of importance based on a configuration of the second candidate machine learning engine.

17. The method of claim 16, wherein the reference data values in the set of reference data values are unordered reference data values that are utilized to determine consecutive highest rankings in the first set of ordered output values from the first candidate machine learning engine and the second set of ordered output values from second candidate machine learning engine.

18. The method of claim 17, wherein the division of the difference by the first number of the reference data values corresponds to a first evaluation metric.

19. The method of claim 17, wherein the difference is a first difference, and further including determining a second evaluation metric based on:
   a second difference between 1) a number corresponding to how many of the reference data values from the set of reference data values are present in the first set of ordered output values and 2) the first number of the reference data values from the set of reference data values;
   addition of a penalty to the second difference for each of the reference data values from the set of reference data values that is not present in the first set of ordered output values; and
   division of the second difference by an addition of 1) a number of values in the first set of ordered output values and 2) the first number of the unordered reference data values from the set of reference data values.

20. The method of claim 19, wherein to determine the first selection metric further includes:
   adding the first evaluation metric and the second evaluation metric to determine a result; and
   dividing the result by two to determine the first selection metric.

* * * * *